July 13, 1965 W. E. DU VALL 3,195,068

AUTOMATIC FREQUENCY CONTROL

Filed Nov. 19, 1962

WILBUR E. DU VALL
INVENTOR.

BY Samuel Lindenberg

ATTORNEY

United States Patent Office 3,195,068

Patented July 13, 1965

3,195,068

AUTOMATIC FREQUENCY CONTROL

Wilbur E. Du Vall, Gardena, Calif., assignor to The W. W. Henry Company, Huntington Park, Calif., a corporation of California Filed Nov. 19, 1962, Ser. No. 238,526
1 Claim. (Cl. 331—27)

Figure 1:
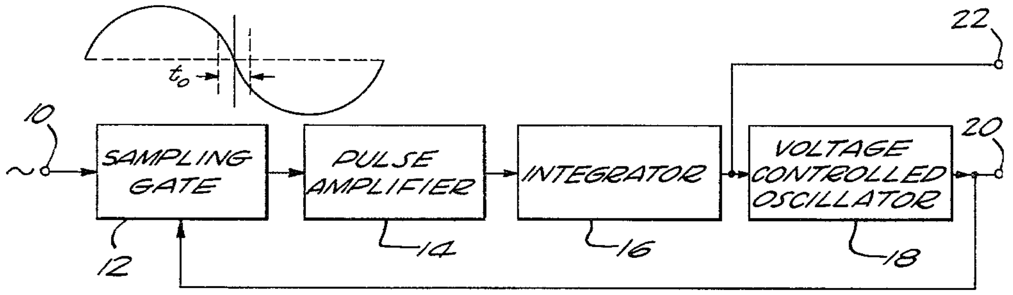

This invention relates to oscillators and more particularly to an improvement in tracking oscillators.

It often happens that signals are transmitted and received which are quite noisy. In order to properly demodulate such a signal one of the techniques employed is to use apparatus known as a tracking oscillator. The function of this tracking oscillator is to effectively duplicate the frequency of the input signal without the noise attendant thereto. That is, an output is derived which is a signal whose frequency and phase are supposed to be substantially identical with the frequency and phase of the input signal, without the attendant noise. With this cleaned up signal, proper demodulation can take place.

Heretofore, the tracking oscillator consisted of a phase discriminator whose output is applied to an extremely high gain D.C. amplifier with a feedback Miller loop. The output of this amplifier is then used for controlling a voltage controlled oscillator. The output of the voltage controlled oscillator is a cleaned up signal which is substantially at the frequency and phase of the input to the phase discriminator. However, since the input signal was continuously applied to the D.C. amplifier, any drift in the D.C. amplifier, and D.C. amplifiers do drift, alters the signal applied to the voltage controlled oscillator which reflects adversely so that, although the resultant output of the voltage controlled oscillator might be identical in frequency, there would not be an identicality of phase with the input signal. This would reflect adversely on any demodulation, since the information modulated on these signals uses both phase modulation as well as frequency modulation techniques.

Accordingly, an object of this invention is to provide a tracking oscillator which can follow not only the frequency of the input signal, but also its phase.

Another object of the present invention is the provision of a novel arrangement for tracking oscillator wherein the output signal is substantially identical in frequency and phase with the input signal.

Yet another object of the present invention is the provision of a novel and unique tracking oscillator system wherein demodulation is provided within the loop which is made with the novel circuit.

These and other objects of the invention may be achieved in an arrangement for a tracking oscillator which includes a gate which samples the incoming signals in the region of the crossing of the zero axis. The output of the gate is a pulse signal which is amplified and then applied to an integrator. The integrator performs a linear integration and an output is produced which is a D.C. signal having an amplitude which is directly representative of the energy content of the input pulse signals. The output of the integrator is applied to a voltage-controlled oscillator. The output of the voltage-controlled oscillator is a signal having a frequency and phase which is identical with that of the input signal. A portion of the output of the voltage-controlled oscillator is fed back to the sampling gate for the purpose of instructing it when to sample the incoming signals. Any alteration in the incoming frequency is closely tracked by the circuitry which has just been described.

Figure 2:
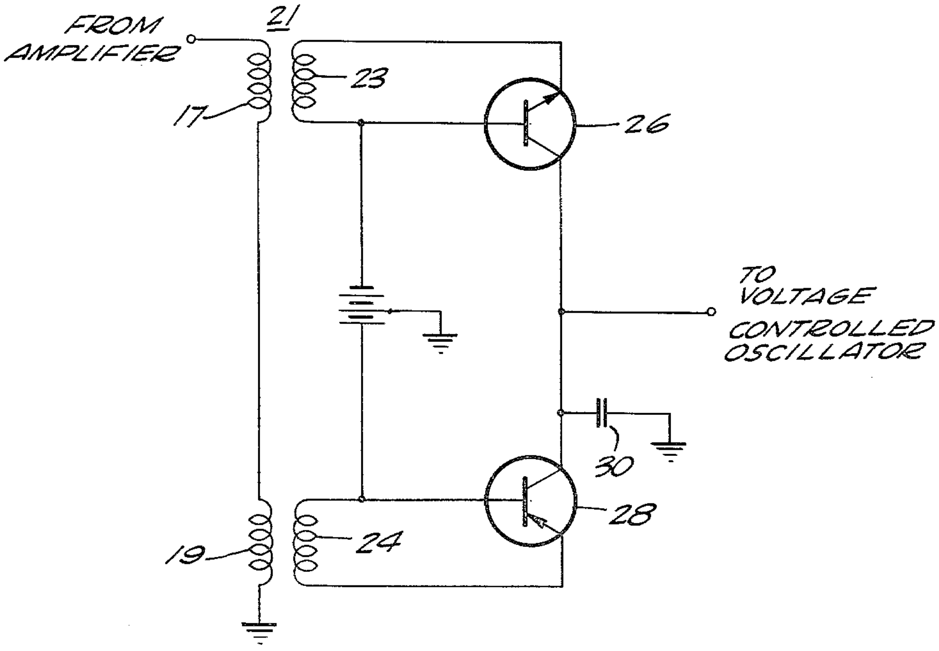

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

There are two figures of the drawing. FIGURE 1 is a block diagram of an embodiment of this invention;

FIGURE 2 is a circuit diagram of a novel, integration circuit for use with the invention.

Reference is now made to FIGURE 1 which is a block diagram of an embodiment of the invention. As previously described, an input signal which can comprise a carrier wave or other signal which has frequency or phase modulation thereon, is received by suitable receiving circuitry. Such signals can have considerable noise, and the problem arises as to how to best handle these signals to separate them from the noise. The tracking oscillator is a circuit which attempts to strip the signal from the noise background by effectively re-creating the signal free of said background. The incoming signal is applied to the input terminal 10 shown in FIGURE 1. A sampling gate circuit 12, which can consist of a well known transistor chopper circuit, is driven to sample the signal at sampling times which will be determined in a manner to be described subsequently herein. These sampling times essentially occur within the region of the crossing of the zero axis by the incoming signal. This may be seen by referring to the sine waveshape shown above the gate 12. During a sampling time $t_0$ to a signal passes through the gate having a positive or negative value as determined by the instantaneous amplitude of the signal during the time $t_0$.

The output of the gate 12 is applied to a pulse amplifier 14. This output consists of pulses occurring at a frequency as determined by the sampling rate of the gate 12. These amplified pulses are applied to an integrator circuit 16. The output of the integrator circuit consists of a signal having an amplitude which is determined by the frequency of the occurrence of the incoming pulses as well as their amplitude. That is, the amplitude of the output of the integrator assumes a stabilized level or D.C. level which is the amplitude required to cause a voltage-controlled oscillator 18, which follows the integrator output to be forced to produce an output signal having the frequency of the input signal being applied to the gate 12.

To clarify further the foregoing statement, let us assume at the outset that the sampling time of the gate 12 of the incoming signal occurs on the positive side of the zero crossing point of the incoming signal. This causes the sample to have a substantial positive amplitude level. As a result, the output of the integrator will, in response to this first sample, be at a substantial D.C. level. This forces the voltage-controlled oscillator to increase its frequency. The output of the voltage-controlled oscillator is fed back to the gate 12, causing it to move the sampling time closer toward the zero crossing axis of the incoming signal. As a result, the second sample will have a smaller amplitude level, since it is closer toward the zero crossing axis where the incoming signal is lower. This second sample is added to the output of the integrator, as it must be because the voltage-controlled oscillator has still not yet assumed the proper phase relationship with the incoming signal. The output of the voltage-controlled oscillator continues to alter the time of occurrence of the sampling interval of the gate 12 until it overlaps the zero crossing region of the incoming signal. It may be seen therefore, that the output of the integrator assumes an amplitude which is determined as a result of the frequency of the input.

The voltage-controlled oscillator is a well known circuit which varies the frequency of its output in response to the level of an input signal. The output of the voltage-controlled oscillator is fed back to the gate 12 to increase or decrease the frequency of the occurrence of the sampling interval. If the incoming signal shifts in phase so that the sample signal is moving in a negative direction, then the amplitude of the output of the integrator 16 is diminished or energy is removed therefrom, whereby, the frequency of the voltage-controlled oscillator is shifted to move the sampling interval to compensate for the shift in the incoming signal.

The output of the voltage-controlled oscillator is applied to an output terminal 20, for use in subsequent circuitry, not shown. It should also be noted that, the output of the integrator, which is applied to a terminal 22, consists of a D.C. voltage which has the phase intelligence, previously modulated on the incoming signal. That is, the amplitude of this signal is a direct function of the phase modulation of the incoming signal.

FIGURE 2 is a circuit diagram of a novel linear integrator which can be employed in the embodiment of the invention. The amplifier 14 drives the primary windings 17, 19, of a transformer 21. The secondary windings respectively 23, 24, of this pulse transformer are connected with respective NPN transistor 26 and PNP transistor 28. The emitter of transistor 26 is connected to one end of the winding 23, and the base of transistor 26 is connected to the other end. The emitter of transistor 28 is connected to one end of the winding 24 and the base is connected to the other end.

The two collectors of the transistors are connected together and to an integrating capacitor 30. Output is also taken to the succeeding voltage-controlled oscillator circuit 19 from the two collectors.

Upon an output pulse from the amplifier 14 being applied to the primary windings 17, 19, the effect of this positive pulse is to back-bias or leave unaffected transistor 26, while it serves to render transistor 28 conductive. As a result, there is a current flow whereby capacitor 30 will charge up to an amplitude as determined by the energy content of the incoming pulse. Should a negative pulse be received from the amplifier 14, then transistor 26 would be rendered conductive and transistor 28 would be rendered non-conductive. The response to a negative pulse would be to drain energy if already there, from the capacitor 30, or to charge the capacitor 30 to a voltage of an opposite polarity if it did not have a sufficiently large positive charge thereon.

From the foregoing description it will be seen that the integrator establishes on the capacitor 30, a D.C. level which is a function of the energy content of the incoming pulse samples. This D.C. level also has a polarity which is determined by the polarity of the incoming signals. Effectively therefore, the D.C. level contains the frequency in phase information of the incoming signal. The signal existing across the capacitor 30 is applied to the voltage-controlled oscillator to determine the frequency in accordance with the level and polarity of this signal.

There has accordingly been described and shown hereinabove, a novel, and useful tracking oscillator circuit. The circuit avoids the problems of drift of the D.C. amplifier by using an integrator whereby a pulse amplifier can be used in the circuit rather than the D.C. amplifier heretofore employed. There is substantially no drift with a pulse amplifier. Any minor changes in gain do not affect the operation of the circuit because they are integrated out by the integrator 17. Because in previous arrangements a signal was continuously applied to a D.C. amplifier, any drift thereby could seriously alter the characteristics of the loop.

I claim:

A tracking oscillator circuit arrangement, for tracking an input signal having a waveshape which periodically crosses a reference axis, comprising sampling gate means to which said input signal is applied for deriving pulse signals at recurrent sampling intervals which are representative of the input signal amplitude during said sample interval, an integrator circuit, said integrator circuit including a first transistor of one impurity type, a second transistor an opposite impurity type, said first transistor having emitter collector and base electrodes, said second transistor having emitter base and collector electrodes, an input transformer having first and second series connected primary windings and first and second secondary windings, means connecting said first secondary windings between said first transistor emitter and base, means connecting said secondary winding between said second transistor emitter and base, means connecting said first and second transistor collectors together, a capacitor, means connecting one end of said capacitor to said connected together collectors, means for applying operating potential between the other end of said capacitor and the bases of said first and second transistors, means for applying pulses to said series connected first and second primary windings whereby an integrated signal is developed across said capacitor, means for applying said pulse signals to said integrator circuit to provide an integrated output signal, a voltage-controlled oscillator, means for connecting the output of said voltage-controlled oscillator to said sampling gate means for determining the frequency of occurrence of said recurrent sampling interval responsive thereto, and means for applying the integrated output signal to said voltage-controlled oscillator to control the frequency of the output thereof to cause said sampling gate to establish the sampling interval about the time said input signal waveshape crosses said reference level.

References Cited by the Examiner

UNITED STATES PATENTS

| | | | |
|---|---|---|---|
| 2,489,262 | 2/47 | Buckbee | 331—27 X |
| 2,521,058 | 9/50 | Goldberg | 328—155 X |
| 2,570,013 | 10/51 | Van Hardenberg | 331—19 |
| 2,636,988 | 4/53 | Palmer | 331—28 |
| 2,773,188 | 12/56 | Hugenholtz | 331—19 |
| 2,851,602 | 9/58 | Cramwinckel et al. | 331—28 X |
| 2,889,467 | 6/59 | Endres et al. | 307—88.5 |
| 3,101,406 | 8/63 | Engelmann | 307—88.5 |

ROY LAKE, *Primary Examiner.*

JOHN KOMINSKI, *Examiner.*